US012441013B2

(12) United States Patent
Chang

(10) Patent No.: US 12,441,013 B2
(45) Date of Patent: Oct. 14, 2025

(54) RAZOR CARTRIDGE

(71) Applicant: DORCO CO., LTD., Seoul (KR)

(72) Inventor: Jun Soo Chang, Seoul (KR)

(73) Assignee: DORCO CO., LTD., Seoul (KR)

( * ) Notice: Subject to any disclaimer, the term of this patent is extended or adjusted under 35 U.S.C. 154(b) by 223 days.

(21) Appl. No.: 18/361,114

(22) Filed: Jul. 28, 2023

(65) Prior Publication Data

US 2024/0051164 A1 Feb. 15, 2024

(30) Foreign Application Priority Data

Aug. 11, 2022 (KR) ........................ 10-2022-0100750

(51) Int. Cl.
*B26B 21/22* (2006.01)
*B26B 21/24* (2006.01)
*B26B 21/40* (2006.01)

(52) U.S. Cl.
CPC ............ *B26B 21/227* (2013.01); *B26B 21/24* (2013.01); *B26B 21/4018* (2013.01); *B26B 21/4031* (2013.01)

(58) Field of Classification Search
CPC ... B26B 21/227; B26B 21/24; B26B 21/4018; B26B 21/4031
See application file for complete search history.

(56) References Cited

U.S. PATENT DOCUMENTS 4,378,634 A 4/1983 Jacobson
4,461,079 A * 7/1984 Ciaffone ............... B26B 21/227 30/79
5,313,706 A 5/1994 Motta et al.
6,671,961 B1 * 1/2004 Santhagens Van Eibergen ........... B26B 21/227 30/34.2
2009/0113717 A1 * 5/2009 Rawle ................... B26B 21/227 30/526
2021/0031387 A1 * 2/2021 Paspatis .............. B26B 21/4012
(Continued)

FOREIGN PATENT DOCUMENTS

KR 10-0461700 B1 8/2005
KR 10-2020-0003894 A 1/2020

OTHER PUBLICATIONS

Office Action dated Feb. 12, 2025 in Korean Patent Application No. 10-2022-0100750 in 10 pages.

*Primary Examiner* — Omar Flores Sanchez
(74) *Attorney, Agent, or Firm* — Knobbe Martens Olson & Bear LLP

(57) ABSTRACT

A razor cartridge is proposed. The razor cartridge may include a plurality of blades each including cutting edges, the plurality of blades including a first blade including a first cutting edge and a second blade including a second cutting edge. The razor cartridge may also include a blade housing longitudinally accommodating the plurality of blades to expose the cutting edge at least partially through an upper portion thereof, the blade housing including a first contact surface and a second contact surface respectively disposed in front and back of the cutting edge. The razor cartridge may further include an elastic arm elastically supporting the second blade. The first contact surface and the second contact surface may define a shaving plane. The first cutting edge may have a smaller exposure value than the second cutting edge with respect to the shaving plane while no external force acts.

16 Claims, 15 Drawing Sheets

(56) References Cited

U.S. PATENT DOCUMENTS

| | | | | |
|---|---|---|---|---|
| 2021/0031388 | A1* | 2/2021 | Xu | B26B 21/60 |
| 2021/0031389 | A1* | 2/2021 | Bozikis | B26B 21/565 |
| 2022/0193939 | A1* | 6/2022 | Galanis | B26B 21/227 |
| 2022/0314475 | A1* | 10/2022 | Hashimoto | B26B 21/227 |
| 2022/0324128 | A1* | 10/2022 | Bozikis | B26B 21/4012 |
| 2023/0390953 | A1* | 12/2023 | Kim | B26B 21/4018 |
| 2024/0033959 | A1* | 2/2024 | Kokozidis | B26B 21/4031 |
| 2024/0198547 | A1* | 6/2024 | Kopelas | B26B 21/443 |

* cited by examiner

10

RAZOR CARTRIDGE

CROSS REFERENCE TO RELATED APPLICATION

This application is based on and claims priority under 35 U.S.C. § 119 to Korean Patent Application No. 10-2022-0100750 filed on Aug. 11, 2022 in the Korean Intellectual Property Office, the disclosure of which is incorporated by reference herein in its entirety.

BACKGROUND

Technical Field

The disclosure relates to a razor cartridge, and more particularly to a razor cartridge in which a razor blade is accommodated.

Description of Related Technology

A razor refers to a device that is used to cut body hair such as stubble, beard, etc. on a face or body. The razor includes a handle for gripping, and a razor cartridge for shaving while being in contact with skin.

SUMMARY

One aspect is a razor cartridge, in which only a blade having a positive exposure value is selectively elastically-supported, thereby providing good shaving performance while reducing a skin irritation.

Another aspect is a razor cartridge that includes a plurality of blades each including cutting edges, the plurality of blades including a first blade including a first cutting edge and a second blade including a second cutting edge; a blade housing longitudinally accommodating the plurality of blades to expose the cutting edge at least partially through an upper portion thereof, the blade housing including a first contact surface and a second contact surface respectively disposed in front and back of the cutting edge; and an elastic arm elastically supporting the second blade, wherein the first contact surface and the second contact surface define a shaving plane, and wherein the first cutting edge has a smaller exposure value than the second cutting edge with respect to the shaving plane while no external force acts.

Various embodiments of the disclosure provide at least the following effects.

The exposure value of the blade having the positive exposure value is adjusted, and the exposure value of the blade having the negative exposure value is kept, thereby maintaining shaving performance while reducing a skin irritation. Further, skin wounds, cuts, etc. are prevented, thereby improving saving safety and thus lowering the risk of infection.

Alternatively, even when the exposure value of at least one blade is not ideally set based on design intention, the elastically supported blades are displaced during the shaving process, thereby exhibiting ideal shaving performance.

The effects of the disclosure are not limited to those described above, and various other effects are included in the foregoing description.

DETAILED DESCRIPTION

Figure 1:
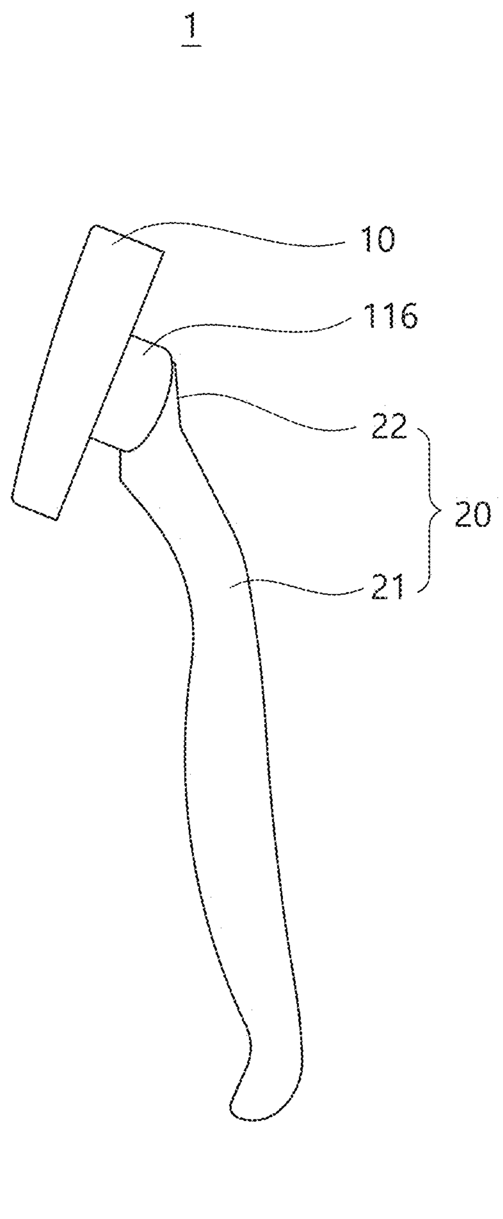
FIG. 1 is a perspective view of a razor according to an embodiment of the disclosure.

A razor is classified into a system razor having a replaceable razor cartridge, and a portable razer having a nonreplaceable razor cartridge. In the razor cartridge, at least one blade is longitudinally accommodated within the blade housing, and the cutting edge of the blade is exposed through the top of the blade housing.

A plane where the razor cartridge contacts with a user's skin is defined as a shaving plane. The shaving plane may be defined as a virtual plane that contacts a guard positioned in the front of the top of the razor cartridge and a cap positioned in the rear of the top of the razor cartridge.

When the cutting edge of the blade is positioned above the shaving plane, it is expressed that the cutting edge has a positive exposure value. When the cutting edge of the blade is positioned below the shaving plane, it is expressed that the cutting edge has a negative exposure value.

The cutting edge having the positive exposure value is excellent hair-cutting ability, but may cause a skin irritation. On the other hand, the cutting edge having the negative exposure value is less irritating to skin but may make it difficult to get a clean shave due to its lower hair-cutting ability. Accordingly, shaving performance and shaving feeling are significantly affected by the exposure value of the cutting edge with respect to the shaving plane.

To reduce the skin irritation caused during a shaving process, there has been proposed a conventional razor cartridge with a spring for elastically supporting the blades (Korean Patent No. 10-0461700). Although the conventional razor cartridge reduces the skin irritation, there still remains a problem that it is difficult to get a clean shave because restoring force is provided to all the blades and thus not only the blade having the positive exposure value but also the blade having the negative exposure value is decreased in the exposure value during the shaving process.

The merits and characteristics of the disclosure and a method for achieving the merits and characteristics will become more apparent from embodiments described below in detail in conjunction with the accompanying drawings. However, the disclosure is not limited to the disclosed embodiments, but may be implemented in various different ways. The embodiments are provided to only complete the disclosure and to allow those skilled in the art to understand the category of the disclosure. The disclosure is defined by the category of the claims.

In addition, embodiments of the disclosure will be described with reference to cross-sectional views and/or schematic views as idealized exemplary illustrations. Therefore, the illustrations may be varied in shape depending on manufacturing techniques, tolerance, and/or etc. Further, elements in the drawings may be relatively enlarged or reduced for convenience of description. Like numerals refer to like elements throughout.

Further, first, second, i), ii), a), b) and the like terms may be used in describing elements according to embodiments of the disclosure. Such terms are used solely for the purpose of differentiating one element from another, but not limit the substances, the order, sequence, etc. of those elements. Throughout this specification, when a part 'includes' or 'comprises' an element, the part is meant to further include other elements rather than excluding other elements unless otherwise stated explicitly.

Below, a razor according to embodiment of the disclosure will be described with reference to the accompanying drawings.

FIG. 1 is a perspective view of a razor 1 according to an embodiment of the disclosure.

Referring to FIG. 1, the razor 1 according to an embodiment includes a razor cartridge 10, and a handle 20 to which the razor cartridge 10 is pivotably coupled.

The handle 20 includes a handle body 21 and a handle header 22.

The handle body 21 refers to a part to be gripped by a user. The handle header 22 is provided at a first end of the handle body 21, allows the razor cartridge 10 to be removably coupled thereto, and pivotably supports the coupled razor cartridge 10.

The handle header 22 couples with a handle coupling portion 116 formed in a lower portion of the razor cartridge 10, and supports the razor cartridge 10 to be pivotable within a predetermined angle range with respect to an immovable shaft or a shaft movable within a predetermined range.

Further, the handle header 22 may removably couple with the handle coupling portion 116. In this case, the handle 20 may be provided with an operation portion (not shown) for operating the handle header 22. A user may operate the operative portion to release the coupling between the handle header 22 and the handle coupling portion 116.

Figure 2:
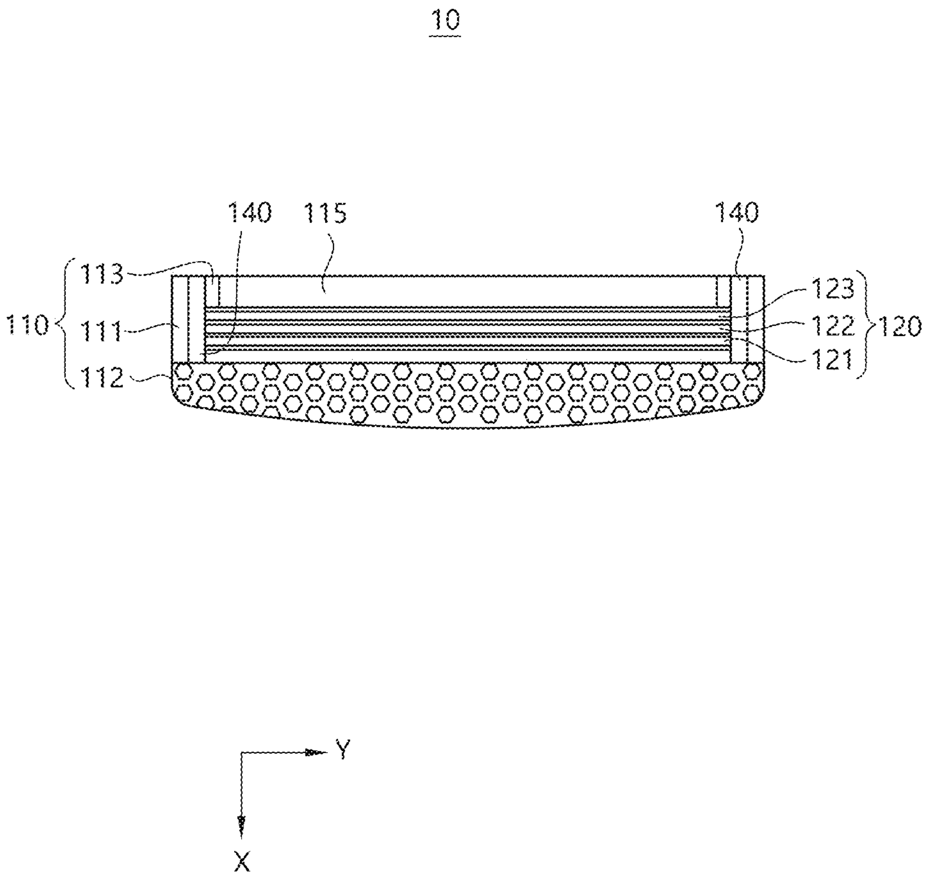
FIG. 2 is a plan view of a razor cartridge according to a first embodiment of the disclosure.

FIG. 2 is a plan view of the razor cartridge 10 according to a first embodiment of the disclosure.

Referring to FIG. 2, the razor cartridge 10 may include a plurality of blades 120, a clip 140, and a blade housing 110.

The blade housing 110 may include a frame 111, a guard 112, and a cap 113.

With respect to the frame 111, the guard 112 is formed in the front of the frame 111, and the cap 113 is formed in the rear of the frame. Here, the front indicates the X-axial direction in FIG. 2, and the rear indicates the negative X-axial direction in FIG. 2. The guard 112 and the cap 113 are formed long along the Y-axial direction.

The guard 112 adheres to a user's skin during a shaving process and pulls the skin, thereby improving the shaving effect of the blade 120. To more effectively pull the user's skin, the guard 112 may have an embossed or engraved pattern on an upper surface thereof, and the upper surface of the guard 112 may be made of rubber, silicone, or the like material. The upper surface of the guard 112 corresponds to a front area in the upper surface of the blade housing 110, and forms a first contact surface **112*a*** that touches the skin during the shaving process.

The cap 113 may include a lubrication band 115 exposed on the upper surface of the blade housing 110. The lubrication band 115 includes a lubricating material, and applies the lubricating material onto a skin surface where the blade 120 has passed during the shaving process. The lubricating material may contain components for protecting the skin after shaving. The upper surface of the cap 113 corresponds to a rear area in the upper surface of the blade housing 110, and forms a second contact area **113*a*** that contacts the skin during the shaving process.

The frame 111 may include a central portion thereof formed open upwards.

The frame 111 accommodates each blade 120 therein longitudinally, and each blade 120 may be transversely arranged in a row transversely with other blades 120. Here, the longitudinal direction refers to a direction parallel to the Y axis in FIG. 2, and the transverse direction refers to a direction parallel to the X axis in FIG. 2.

The plurality of blades 120 includes a first blade 121 located at the frontmost side, a third blade 123 located at the rearmost side, and a second blade 122 located between the first blade 121 and the third blade 123.

FIG. 2 illustrates an example that the razor cartridge 10 includes three blades 121, 122 and 123, but the number of blades 120 may be varied depending on embodiments.

The frame 111 may include the handle coupling portion 116 (see FIG. 1) extended rearwards.

The clip 140 wraps around both sides of the frame 111 and attached to the blade housing 110. The clip 140 prevents the blade 120 from separating from the blade housing 110.

Figure 3:
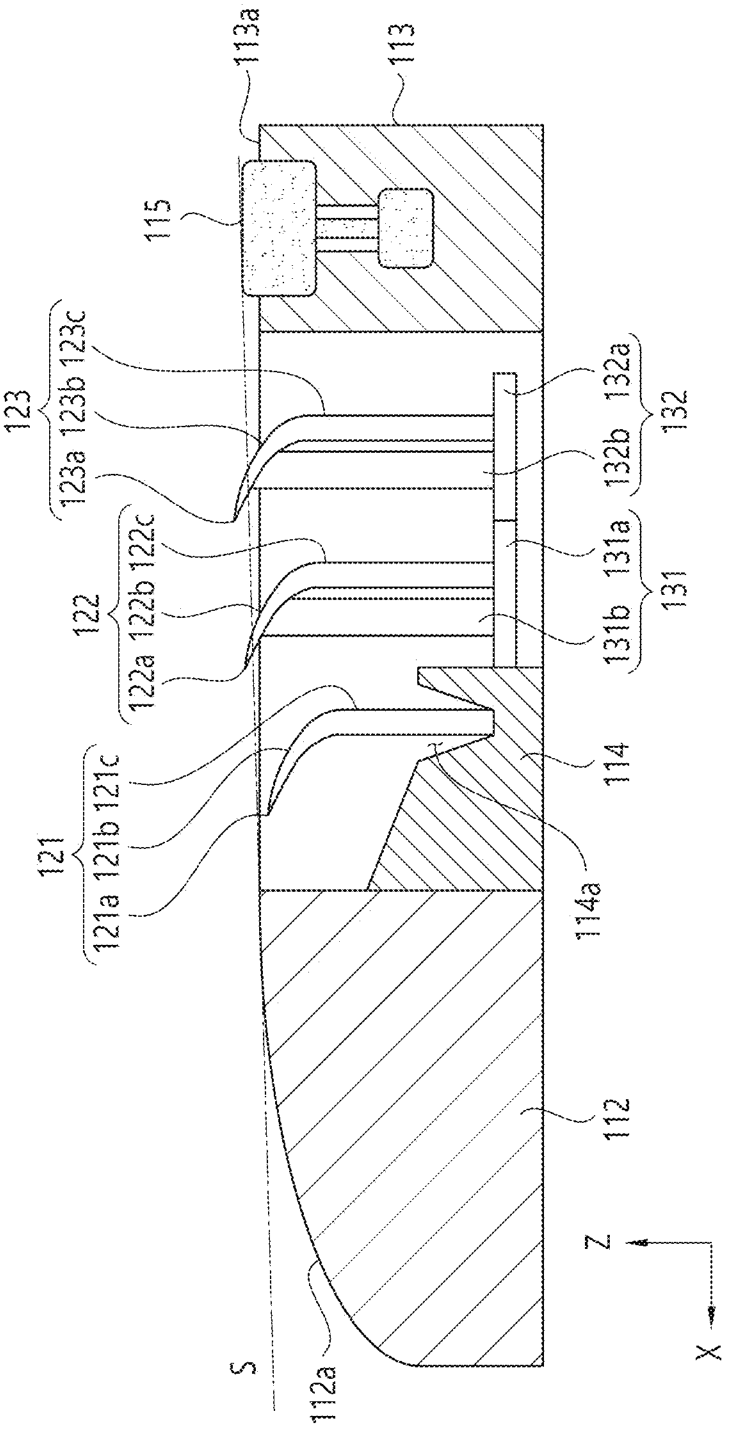
FIG. 3 is a schematic cross-sectional view of the razor cartridge according to the first embodiment of the disclosure.

FIG. 3 is a schematic cross-sectional view of the razor cartridge 10 according to the first embodiment of the disclosure.

Referring to FIG. 3, the blades 121, 122 and 123 may include cutting edges **121*a*, 122*a* and 123*a*, edge portions 121*b*, 122*b* and 123*b*, and base portions 121*c*, 122*c* and 123*c***, respectively.

The first blade 121 may include the first cutting edge **121*a*, the first edge portion 121*b*, and the first base portion 121*c***.

The first base portion **121*c* is extended from the first cutting edge 121*a* towards a lower portion of the blade housing 110 (in the negative Z-axial direction), and the first edge portion 121*b* connects the first cutting edge 121*a* and the first base portion 121*c* so that the first cutting edge 121*a*** can maintain a predetermined angle to the first base portion

121*c*. The first cutting edge 121*a* is extended along the longitudinal direction of the blade 120.

The second blade 122 may also include a second cutting edge 122*a*, a second edge portion 122*b*, and a second base portion 122*c* similar to the first blade 121, and the third blade 123 may also include a third cutting edge 123*a*, a third edge portion 123*b*, and a third base portion 123*c* similar to the first blade 121.

In FIG. 3, an integrated bending blade where the cutting edge, the edge portion, and the base portion are integrated is illustrated as an example of the blades 121, 122 and 123, but a welded blade where the edge portion including the cutting edge is welded to the base portion may be implemented as the blade according to embodiments.

The plurality of blades 120 are accommodated in the frame 111 so that the cutting edges 121*a*, 122*a* and 123*a* can be at least partially exposed to the top of the blade housing 110 through the opened upper portion of the frame 111. The plurality of blades 120 are accommodated in the frame 111 so that the cutting edges 121*a*, 122*a* and 123*a* can be oriented toward the front of the blade housing 110. Therefore, the first contact surface 112*a* is positioned in front of the cutting edges 121*a*, 122*a* and 123*a*, and the second contact surface 113*a* is positioned in rear of the cutting edges 121*a*, 122*a* and 123*a*.

The first blade 121 is positioned between the second blade 122 and the first contact surface 112*a*, the second blade 122 is positioned between the first blade 121 and the second contact surface 113*a* and also positioned between the third blade 123 and the first contact surface 112*a*, and the third blade 123 is positioned between the second blade 122 and the second contact surface 113*a*.

Figure 4:
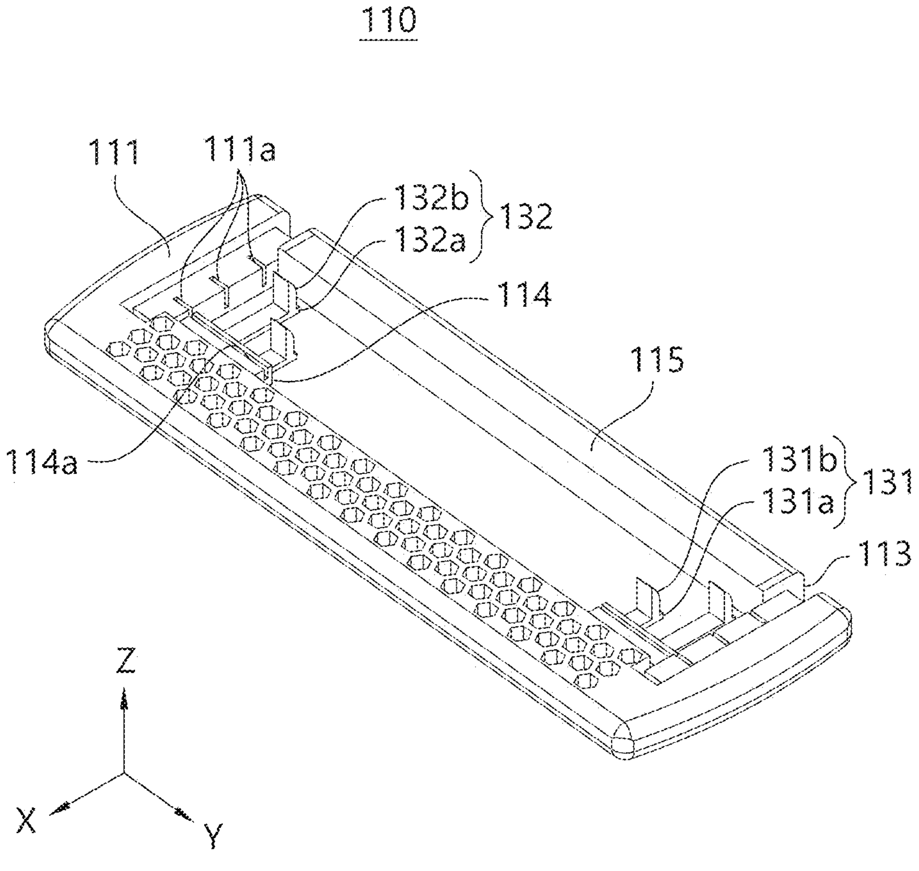
FIG. 4 is a perspective view showing a blade housing, from which blades are removed, in the razor cartridge according to the first embodiment of the disclosure.

FIG. 4 is a perspective view showing the blade housing 110, from which the blade 120 is removed, in the razor cartridge 10 according to the first embodiment of the disclosure.

Referring to FIGS. 3 and 4, the first blade 121 may be accommodated within the blade housing 110 as it is fixed in a seating portion 114. The seating portion 114 may include a lower accommodating groove 114*a* for accommodating and supporting the first base portion 121*c* of the first blade 121. The seating portion 114 may be formed integrally with the frame 111. Alternatively, the seating portion 114 may be extended from the guard 112. However, all the blades may be supported in an elastic arm (to be described later) without the seating portion 114, and one or more blades may be fixed in the seating portion 114.

FIGS. 3 and 4 illustrate that the first blade 121 is supported in the seating portion 114 longitudinally extended inwards from the frame 111, but the disclosure is not limited thereto. For example, the razor cartridge 10 may not include the seating portion. In this case, the first blade 121 may be supported in lateral accommodating grooves 111*a* formed at longitudinal lateral sides of the frame 111, and elastic arms 131 and 132 may be directly extended from the guard 112. As reasonably shown in FIG. 3, a blade fixing structure such as the seating portion 114 and/or the lateral accommodating grooves 111*a* may be formed in the blade housing 110 and fixedly supporting the first blade 121 such that the first blade 121 may not vertically move in response to external force being applied thereto.

Although it is not shown, the frame 111 may further include a middle blade seating portion (not shown) transversely extended from the guard 112 and/or the cap 113 and supporting at least some among the plurality of blades, and the first blade 121 may be supported in the middle blade seating portion.

The concept of the seating portion may involve any configuration for fixedly supporting the first blade 121, which has a structure similar to the seating portion 114 shown in FIGS. 3 and 4, or in which the lateral accommodating groove 111*a* and/or the middle blade seating portion may be used as the foregoing seating portion.

Although it is not shown, the seating portion may be configured as a support arm having a structure similar to an elastic arm (to be described later). In this case, the support arm for supporting the first blade 121 may be formed of a material or structure that does not behave substantially elastically.

The second blade 122 may be elastically supported by the first elastic arm 131, and the third blade 123 may be elastically supported by the second elastic arm 132.

The first elastic arm 131 includes a first elastic base 131*a* and a first support arm 131*b*.

The first elastic base 131*a* may be transversely extended from the seating portion 114 or the guard 112. The first elastic base 131*a* may include a first end as a fixed end supported on the seating portion 114 or the guard 112, and a second end as a free end elastically supporting the second base portion 122*c*.

The first support arm 131*b* may be extended from the first elastic base 131*a* upwards (in the positive Z-axial direction) and support the second edge portion 122*b*.

The first elastic base 131*a* is elastically transformed by force applied to the second blade 122 downwards (in the negative Z-axial direction) and elastically supports the second blade 122.

The second elastic arm 132 includes a second elastic base 132*a* and a second support arm 132*b*.

The second elastic base 132*a* may be transversely extended from the seating portion 114. The second elastic base 132*a* may include a first end as a fixed end supported on the seating portion 114 or the guard 112, and a second end as a free end elastically supporting the third base portion 123*c*.

The second support arm 132*b* may be extended from the second elastic base 132*a* upwards (in the positive Z-axial direction) and support the third edge portion 123*b*.

The second elastic base 132*a* is elastically transformed by force applied to the third blade 123 downwards (in the negative Z-axial direction) and elastically supporting the third blade 123.

FIGS. 3 and 4 illustrate an example that the first elastic base 131*a* and the second elastic base 132*a* are formed separately, but the first elastic base 131*a* and the second elastic base 132*a* may be formed integrally according to embodiments.

Meanwhile, FIGS. 3 and 4 illustrate that the elastic arms 131 and 132 employs the elastic bases 131*a* and 132*a* to support the base portion of the blade and employs the support arms 131*b* and 132*b* to support the edge portion of the blade, but this embodiment is not limited thereto. For example, the elastic arms 131 and 132 may support only the base portion of the blade or only the edge portion. When the elastic arms 131 and 132 support only the base portion of the blade, the elastic arms 131 and 132 may not include the support arms.

FIGS. 3 and 4 illustrate an example that the first elastic base 131*a* and the second elastic base 132*a* are extended from the seating portion 114, but the first elastic base 131*a* and the second elastic base 132*a* may be extended from the guard 112 according to embodiments.

Meanwhile, referring to FIG. 4, the frame 111 may be formed with the lateral accommodating grooves 111*a* at opposite sides thereof in the Y-axial direction so as to accommodate and support both ends of the blades 121, 122 and 123. The foregoing clip 140 (see FIG. 2) may be positioned on the lateral accommodating grooves 111*a* while both ends of the blades 121, 122 and 123 are accommodated in the lateral accommodating grooves 111*a*, thereby preventing the blades 120 from separating from the blade housing 110.

The second blade 122 and the third blade 123 may be respectively elastically supported by the elastic arms 131 and 132 without touching the bottoms of the lateral accommodating grooves 111*a*, so that the second blade 122 and the third blade 123 can be elastically supported and displaced by the elastic arms 131 and 132 while both ends of the blades 121, 122 and 123 are accommodated in the lateral accommodating grooves 111*a*. In this case, the bottoms of the lateral accommodating grooves 111*a* accommodating the second blade 122 and the third blade 123 therein may be formed lower than the bottom of the lateral accommodating groove 111*a* accommodating the first blade 121. Alternatively, the lateral accommodating grooves 111*a* respectively accommodating the blades 121, 122 and 123 therein may be formed equally, and the base portion 121*c* of the first blade 121 may be formed longer than the base portion 122*c* of the second blade 122 and the base portion 122*c* of the third blade 123.

Figure 5:
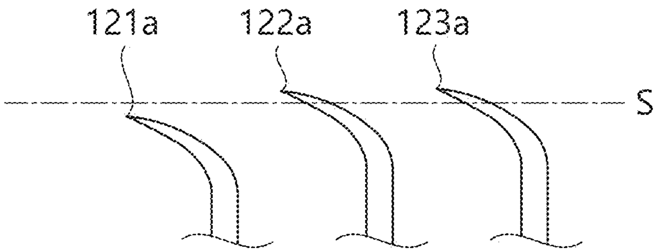
FIG. 5 schematically illustrates relative positions between a shaving plane and blades in a state that no external force acts on the razor cartridge according to the first embodiment of the disclosure.

FIG. 5 schematically illustrates relative positions between the shaving plane S and the blade 120 in a state that no external force acts on the razor cartridge 10 according to the first embodiment of the disclosure.

Referring to FIG. 5, in the razor cartridge 10 according to an embodiment is in a state where the external force is not acting on each blade 120, the cutting edge 121*a* of a certain blade 121 may be positioned below the saving plane S and the cutting edges 122*a* and 123*a* of the other blades 122 and 122 may be positioned above the saving plane S.

The shaving plane S refers to a plane where the razor cartridge 10 comes into contact with a user's skin, and may be based on the shape of the blade housing 110. For example, the shaving plane S may be defined as a plane that touches the first contact surface 112*a* and the second contact surface 113*a*.

It may be expressed that the cutting edge positioned below the shaving plane S has the negative exposure value, and the cutting edge positioned on the shaving plane S has an exposure value of '0' or is in a neutral state, and the cutting edge positioned above the shaving plane S has the positive exposure value.

In general, the cutting edge having the negative exposure value is less irritating during shaving but may make it difficult to get a clean shave because body hair cannot be cut close to skin, and the cutting edge having the positive exposure value makes it possible to get a clean shave but may cause a severe irritation during the shaving because body hair can be cut close to skin. According to an embodiment, when the second blade 122 and the third blade 123 are pressed and forced downward during the shaving process even though the second cutting edge 122*a* and the third cutting edge 123*a* have the positive exposure values in the state that no external force acts, the second blade 122 and the third blade 123 are elastically supported by the first elastic arm 131 and the second elastic arm 132, respectively, and descend relative to the blade housing 110.

Figure 6:
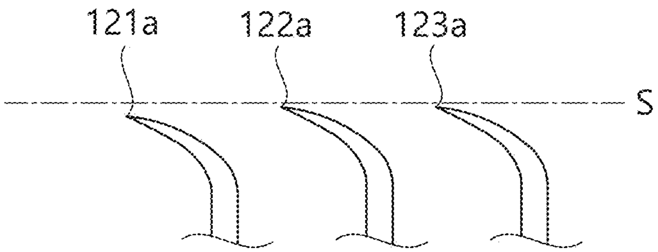
FIG. 6 schematically illustrates relative positions between a shaving plane and blades of the razor cartridge according to the first embodiment of the disclosure during shaving.

FIG. 6 schematically illustrates relative positions between the shaving plane S and the blade 120 of the razor cartridge 10 according to the first embodiment of the disclosure during shaving.

Referring to FIG. 6, the first blade 121 is fixedly installed to the blade housing 110, and thus the position of the first cutting edge 121*a* is not changed. The first blade 121 is the frontmost blade among the plurality of blades 120, and cuts a large amount of body hair. Further, the remaining body hair is cut by the following second blade 122 and third blade 123, and therefore the first blade 121 may be positioned to reduce a shaving irritation rather than increase the cutting capability. Therefore, the first cutting edge 121*a* may be fixedly installed to have the negative exposure value. However, the disclosure is not limited the foregoing embodiment, and the first cutting edge 121*a* may have a small positive exposure value or an exposure value of '0' according to embodiment.

However, the second blade 122 and the third blade 123 are elastically supported by the first elastic arm 131 and the second elastic arm 132, respectively, and descend relative to the blade housing 110, so that the second cutting edge 122*a* and the third cutting edge 123*a*, which have had the positive exposure value or an exposure value greater than that of the first cutting edge 121*a*, can descend to have a smaller positive exposure value, the exposure value of '0' or the negative exposure value.

Therefore, it is possible to get an ideal shave while reducing the shaving irritation.

By changing the shape or material of the first elastic arm 131 and/or the second elastic arm 132, it is possible to adjust the descending levels of the second cutting edge 122*a* and the third cutting edge 123*a*. For example, with respect to the same displacement, the elastic force generated in the second elastic arm 132 is designed to be greater than the elastic force generated in the first elastic arm 131, so that the descending level of the third cutting edge 123*a* can be smaller than the descending level of the second cutting edge 122*a*. In this case, during the shaving, the second cutting edge 122*a* may be displaced to have the exposure value of '0' but the third cutting edge 123*a* may be displaced to have the positive exposure value. Because the last body hair cutting is performed by the third cutting edge 123*a*, the third cutting edge 123*a* having the positive exposure value makes it possible to get a cleaner shave.

The difference in elastic force between the elastic arms 131 and 132 for the same displacement may be implemented by designing the elastic arms 131 and 132 to be different in shape, e.g., width, length, thickness, etc. or to use materials different in modulus of elastic force.

As described above, in the razor cartridge 10 according to this embodiment, the blades 122 and 123 including the cutting edges 122*a* and 123*a* having the positive exposure values are elastically supported by the elastic arms 131 and 132, so that the blades 122 and 123 elastically supported by the elastic arms 131 and 132 can be displaced during the shaving process and change their cutting edges 122*a* and 123*a* to have ideal exposure values even though the exposure values of the cutting edges 122*a* and 123*a* are not ideal, thereby making it possible to get an ideal shave. Therefore, when the first cutting edge 121*a* has the positive exposure value, the first blade 121 is not fixedly mounted to the blade housing 110 while being supported in the seating portion 114 but displaceably mounted to the blade housing 110 while being elastically supported by the elastic arms 131 and 132.

Meanwhile, although the razor cartridge is designed so that the cutting edges of the blades can have exposure values preset according to the positions of the blades, the exposure values of the cutting edges of the blades may be set differently from design intention due to errors occurring in the process of manufacturing the blade housing and/or the blades, errors occurring in the process of assembling the blades, etc. In particular, as shown in FIG. 5, when the cutting edge is designed to have a relatively large exposure value, such errors are likely to occur more frequently. According to an embodiment, only the blades 122 and 123 designed to have the relatively large exposure values are elastically supported, thereby making it possible to compensate for such errors.

As referred to later, razor cartridges according to other embodiments will be described. For the convenience of description, parts similar to those of the first embodiment are denoted by the same reference numerals, and the description of parts common to those of the first embodiment will be omitted.

Figure 7:
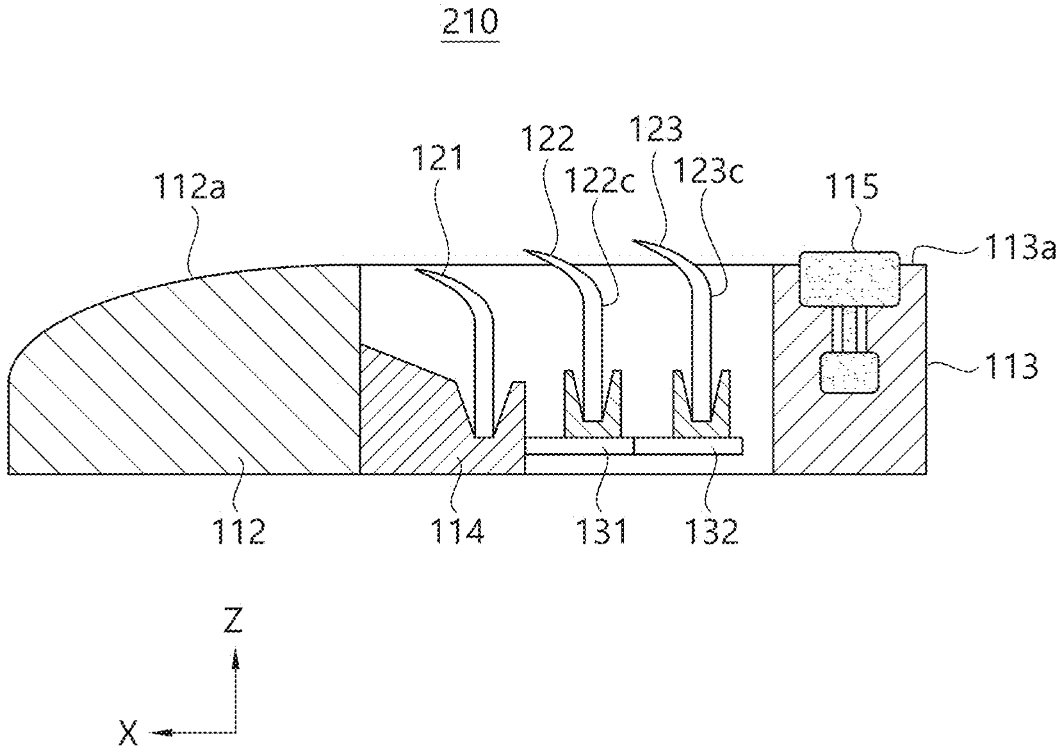
FIG. 7 is a schematic cross-sectional view of a razor cartridge according to a second embodiment of the disclosure.

FIG. 7 is a schematic cross-sectional view of a razor cartridge 210 according to a second embodiment of the disclosure.

Referring to FIG. 7, the razor cartridge 210 according to the second embodiment of the disclosure includes the elastic arms 131 and 132 different in shape from those of the razor cartridge 10 according to the first embodiment of the disclosure.

In the razor cartridge 210 according to the second embodiment of the disclosure, the elastic arms 131 and 132 do not include separate support arms, but have structures for accommodating and supporting the base portions 122*c* and 123*c* of the second blade 122 and the third blade 123, respectively. Each of the structures for accommodating and supporting the base portions 122*c* and 123*c* may be formed similarly to the seating portion 114.

As described in relation to the razor cartridge 10 according to the first embodiment, the first blade 121 may be supported by only the lateral accommodating groove 111*a* and/or the middle blade seating portion without the seating portion 114. Further, the concept of the seating portion may involve any configuration for fixedly supporting the first blade 121.

Figure 8:
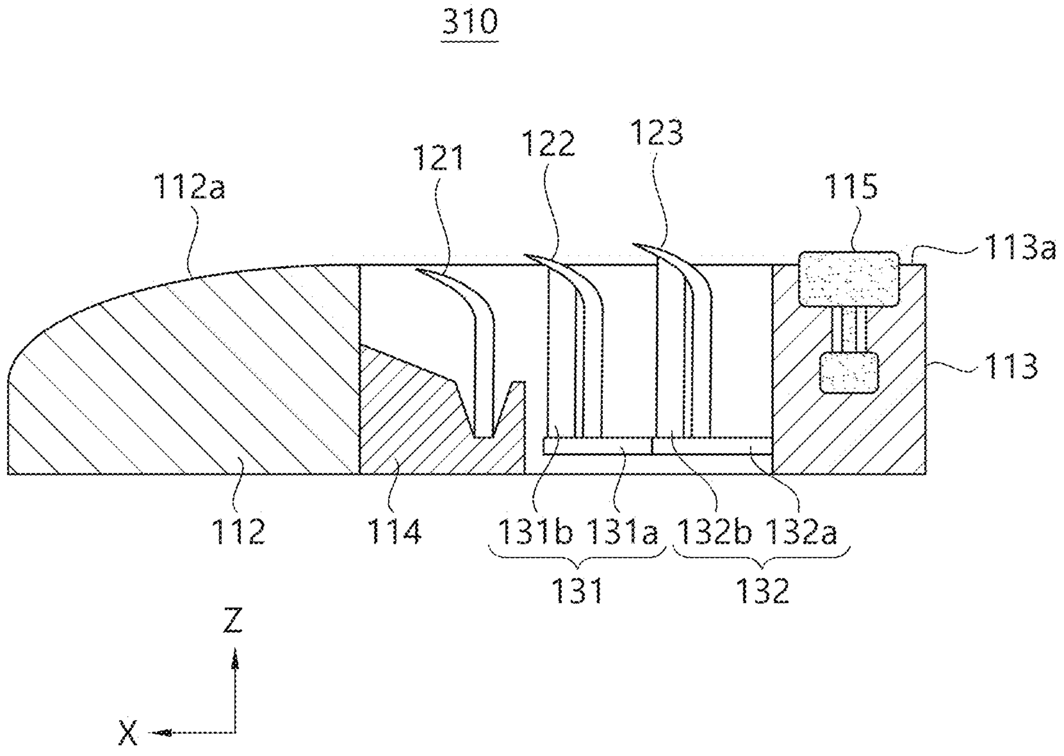
FIG. 8 is a schematic cross-sectional view of a razor cartridge according to a third embodiment of the disclosure.

FIG. 8 is a schematic cross-sectional view of a razor cartridge 310 according to a third embodiment of the disclosure.

Referring to FIG. 8, as compared with the razor cartridge 10 according to the first embodiment of the disclosure, the razor cartridge 310 according to the third embodiment of the disclosure may include the elastic arms 131 and 132 of which elastic bases 131*a* and 131*b* may be extended from the cap 113.

As described in relation to the razor cartridge 10 according to the first embodiment, the first blade 121 may be supported by only the lateral accommodating groove 111*a* and/or the middle blade seating portion without the seating portion 114. Further, the concept of the seating portion may involve any configuration for fixedly supporting the first blade 121.

Figure 9:
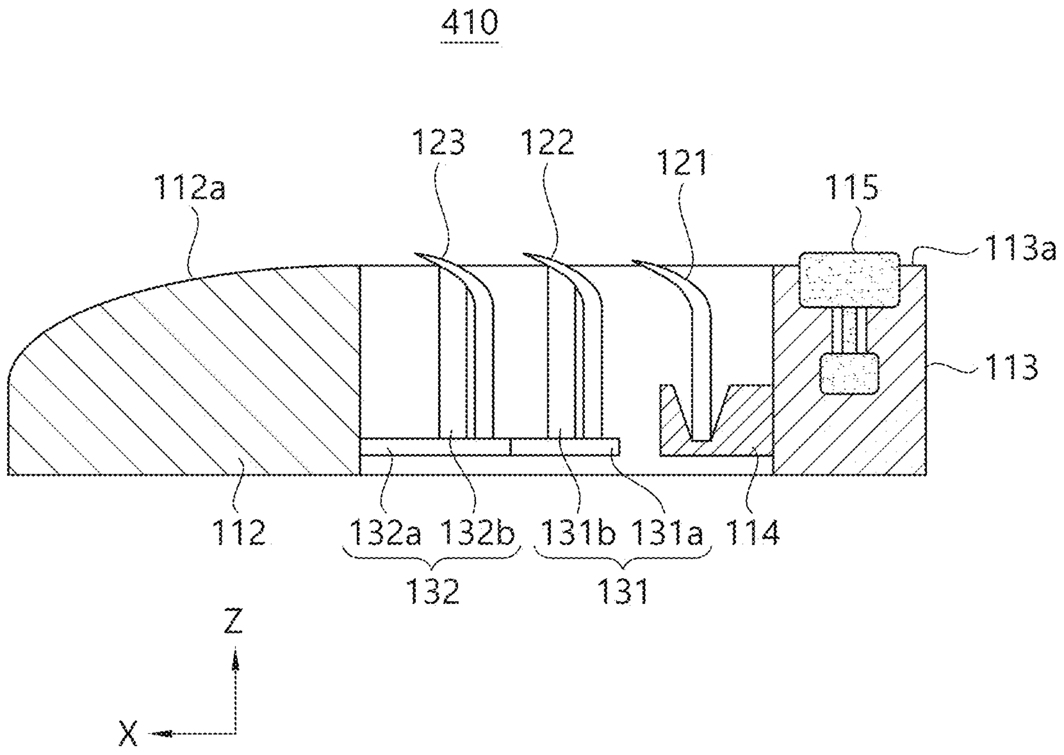
FIG. 9 is a schematic cross-sectional view of a razor cartridge according to a fourth embodiment of the disclosure.
Figure 10:
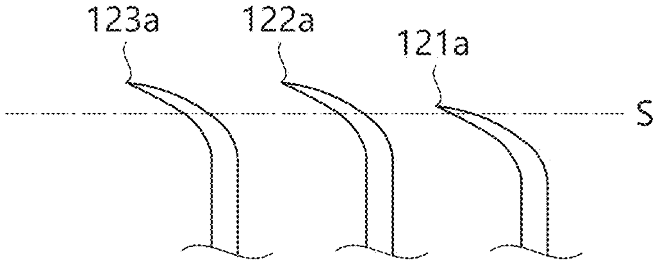
FIG. 10 schematically illustrates relative positions between a shaving plane and blades in a state that no external force acts on the razor cartridge according to the fourth embodiment of the disclosure.
Figure 11:
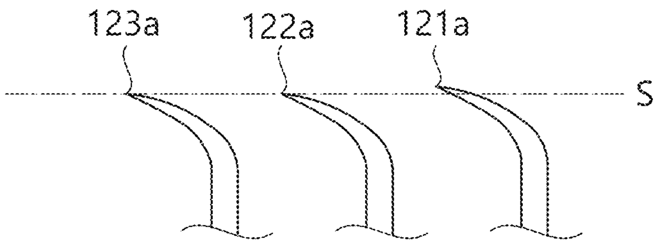
FIG. 11 schematically illustrates relative positions between a shaving plane and blades of the razor cartridge according to the fourth embodiment of the disclosure during shaving.

FIG. 9 is a schematic cross-sectional view of a razor cartridge 410 according to a fourth embodiment of the disclosure, FIG. 10 schematically illustrates relative positions between the shaving plane S and the blade 120 in a state that no external force acts on the razor cartridge 410 according to the fourth embodiment of the disclosure, and FIG. 11 schematically illustrates relative positions between the shaving plane S and the blade 120 of the razor cartridge 410 according to the fourth embodiment of the disclosure during shaving.

Referring to FIG. 9, as compared with the razor cartridge 10 according to the first embodiment of the disclosure, the razor cartridge 410 according to the fourth embodiment of the disclosure includes the first blade 121 positioned at the rearmost among the blades 120, the third blade 123 positioned at the foremost, and the second blade 122 positioned between the first blade 121 and the third blade 123.

The first blade 121 is positioned between the second blade 122 and the second contact surface 113*a*, the second blade 122 is positioned between the first blade 121 and the first contact surface 112*a* and positioned between the third blade 123 and the second contact surface 113*a*, and the third blade 123 is positioned between the second blade 122 and the first contact surface 112*a*.

The first blade 121 is accommodated in the blade housing 110 as it is fixed by the seating portion 114. The seating portion 114 may be formed integrally with the frame 111, or may be extended from the cap 113. However, the disclosure is not limited to this embodiment, and the first blade 121 according to an alternative embodiment may be supported by only the lateral accommodating groove 111*a* and/or the middle blade seating portion without the seating portion 114. Further, the concept of the seating portion may involve any configuration for fixedly supporting the first blade 121.

The second blade 122 is elastically supported by the first elastic arm 131, and the third blade 123 is elastically supported by the second elastic arm 132. The first elastic arm 131 and the second elastic arm 132 may be extended rearward from the guard 112. Alternatively, the first elastic arm 131 and the second elastic arm 132 may be extended frontward from the seating portion 114.

Referring to FIG. 10, the second cutting edge 122*a* and the third cutting edge 123*a* protrude more upward than the first cutting edge 121*a*. The second cutting edge 122*a* and the third cutting edge 123*a* may have the positive exposure values in the state that no external force acts.

The rearmost first cutting edge 121*a* among the plurality of cutting edges 121*a*, 122*a*, and 123*a* may have an exposure value of '0' or a positive exposure value. When the first cutting edge 121*a* has the positive exposure value, the first cutting edge 121*a* may cause a little shaving irritation but make it possible to get a cleaner shave.

When the second blade 122 and the third blade 123 are pressed and forced downward during the shaving process even though the second cutting edge 122*a* and the third cutting edge 123*a* have the positive exposure values, the second blade 122 and the third blade 123 are elastically supported by the first elastic arm 131 and the second elastic arm 132, respectively, and descend relative to the blade housing 110.

Referring to FIG. 11, the first blade 121 is fixedly installed to the blade housing 110, and thus the position of the first cutting edge 121*a* is not changed during the shaving process. However, the second blade 122 and the third blade 123 are elastically supported by the first elastic arm 131 and the second elastic arm 132, respectively, and descend relative to the blade housing 110, so that the second cutting edge 122*a* and the third cutting edge 123*a*, which have had the positive exposure values, can descend to have a smaller positive exposure value, the exposure value of '0' or the negative exposure value. Therefore, it is possible to get an ideal shave while reducing the shaving irritation caused by the second cutting edge 122*a* and the third cutting edge 123*a*.

Meanwhile, FIG. 10 illustrates that all the cutting edges 121*a*, 122*a* and 123*a* have the positive exposure values in the state that no external force is applied thereto, but the disclosure is not limited to this embodiment.

For example, in the state that no external force is applied, the first cutting edge 121*a* may have a smaller exposure value than the second and third cutting edges 122*a* and 123*a* and may also have a neutral or negative exposure value. Alternatively, in the state that no external force is applied, the second and third cutting edges 122*a* and 123*a* may have a greater exposure value than the first cutting edge 121*a* and may also have a neutral or negative exposure value.

Figure 12:
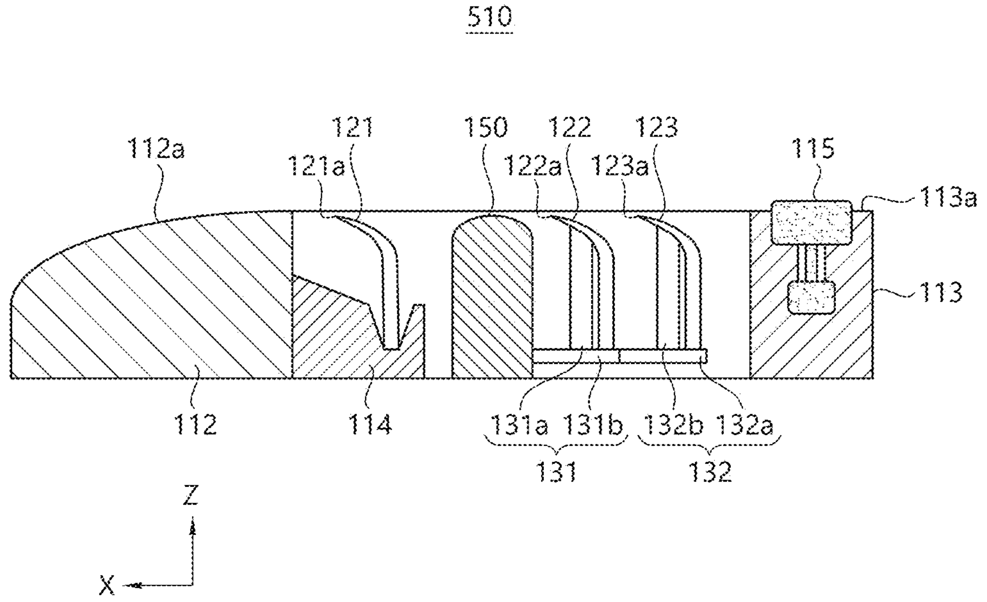
FIG. 12 is a schematic cross-sectional view of a razor cartridge according to a fifth embodiment of the disclosure.

FIG. 12 is a schematic cross-sectional view of a razor cartridge 510 according to a fifth embodiment of the disclosure.

Referring to FIG. 12, as compared with the razor cartridge 10 according to the first embodiment of the disclosure, the razor cartridge 510 according to the fifth embodiment of the disclosure further includes a skin contact member 150, from which the first elastic arm 131 and the second elastic arm 132 are extended.

The skin contact member 150 may be longitudinally accommodated in the frame 111, so that the top of the skin contact member 150 can be exposed to the top of the blade housing 110 through the upper portion of the frame 111. The skin contact member 150 may be longitudinally extended to have approximately the same length as the cutting edges 121*a*, 122*a* and 123*a* of the blade 120. The skin contact member 150 may be fixedly installed to the frame 111, or may be installed to be displaceable up and down as it is elastically supported by the frame 111.

The skin contact member 150 comes into contact with skin during the shaving process, thereby reducing a skin irritation.

Further, the skin contact member 150 pulls skin during the shaving process, thereby improving a shaving effect of the blades 122 and 123 following the skin contact member 150. To this end, the skin contact member 150 may be formed with an embossed or engraved pattern on the top thereof. Further, the top of the skin contact member 150 may be made of rubber, silicone, or the like material.

Alternatively, a lubricating material may be applied to the top of the skin contact member 150, so that the lubricating material can be applied to the surface of skin during the shaving process.

Alternatively, a plurality of combs may be formed on the top of the skin contact member 150 while being transversely extended and longitudinally arranged side by side, thereby straightening body hair during the shaving process.

The skin contact member 150 may be positioned between the first contact surface 112*a* and the second contact surface 113*a*, and have a positive exposure value with respect to the shaving plane S or an exposure value greater than those of the first cutting edge 121*a* and the second cutting edge 122*a* so as to maintain contact with skin during the shaving process. However, the disclosure is not limited to this embodiment.

The skin contact member 150 may be positioned between the first blade 121 and the second blade 122, so that the second blade 122 and the third blade 123 can be positioned to come after the skin contact member 150.

The first elastic base 131*a* of the first elastic arm 131 and the second elastic base 132*a* of the second elastic arm 132 may be extended from the skin contact member 150, and elastically support the second blade 122 and the third blade 123, respectively.

Although it is not shown, according to an alternative embodiment, the skin contact member 150 may be positioned between the second blade 122 and the third blade 123. In this case, the first elastic base 131*a* of the first elastic arm 131 and the second elastic base 132*a* of the second elastic arm 132 may be extended from the skin contact member 150 in opposite directions to each other, thereby elastically supporting the second blade 122 and the third blade 123, respectively.

As described in relation to the razor cartridge 110 according to the first embodiment, the first blade 121 may be supported by only the lateral accommodating groove 111*a* and/or the middle blade seating portion without the seating portion 114. Further, the concept of the seating portion may involve any configuration for fixedly supporting the first blade 121.

Figure 13:
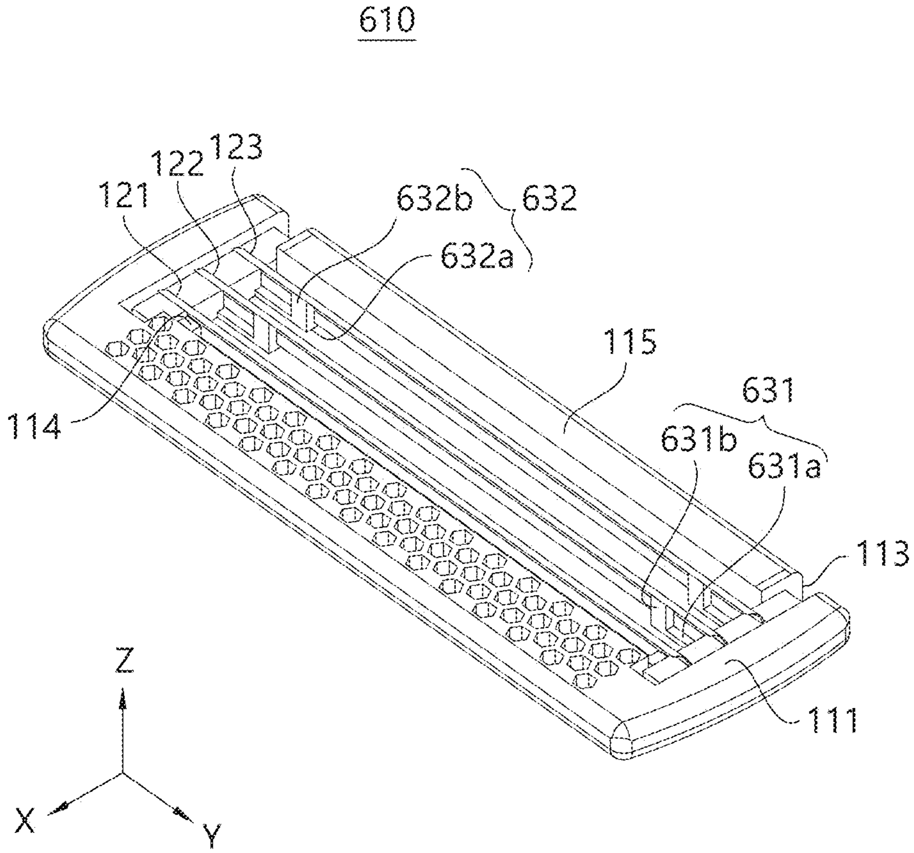
FIG. 13 is a perspective view of a razor cartridge according to a sixth embodiment of the disclosure.
Figure 14:
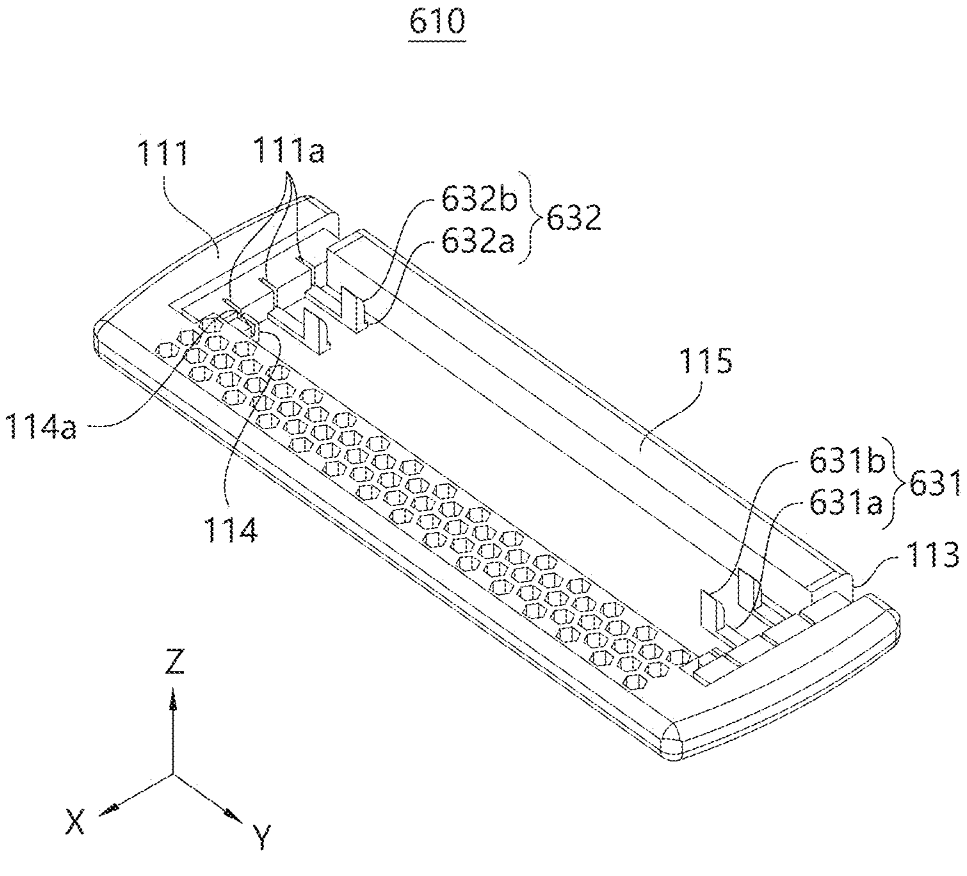
FIG. 14 is a perspective view of a blade housing, from which blades are removed, in the razor cartridge according to the sixth embodiment of the disclosure.
Figure 15:
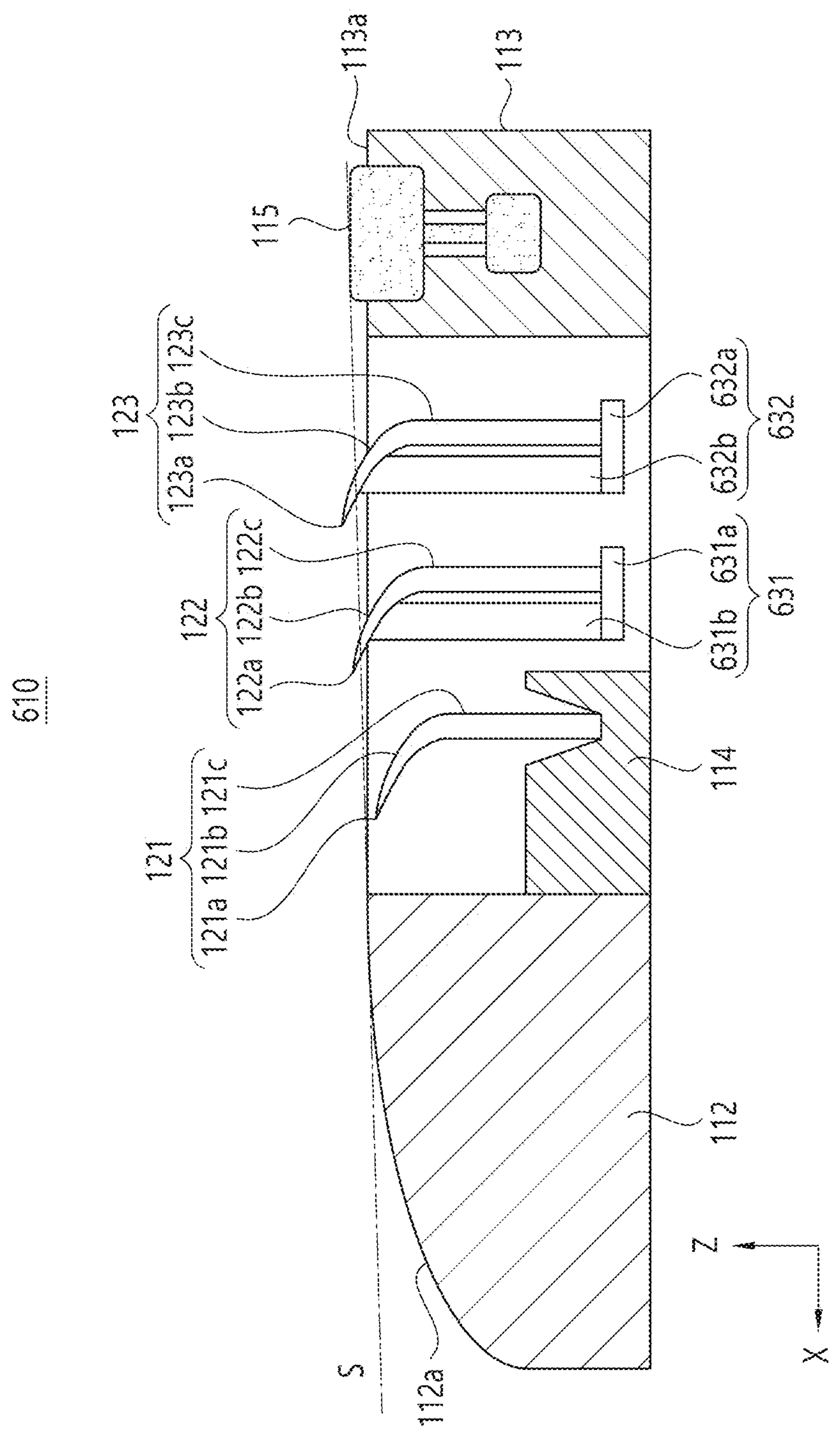
FIG. 15 is a schematic cross-sectional view of a razor cartridge according to the sixth embodiment of the disclosure.

FIG. 13 is a perspective view of a razor cartridge 610 according to a sixth embodiment of the disclosure, FIG. 14 is a perspective view of the blade housing 110, from which the blade 120 is removed, in the razor cartridge 610 according to the sixth embodiment of the disclosure, and FIG. 15 is a schematic cross-sectional view of the razor cartridge 610 according to the sixth embodiment of the disclosure Referring to FIGS. 13 to 15, the razor cartridge 610 according to the sixth embodiment of the disclosure includes elastic arms 631 and 632 different in shape from those of the razor cartridge 10 according to the first embodiment of the disclosure.

In more detail, the razor cartridge 10 according to the first embodiment of the disclosure includes the first elastic base 131*a* and the second elastic base 132*a* extended transversely (i.e., in the X-axial direction), but the razor cartridge 610 according to the sixth embodiment of the disclosure includes a first elastic base 631*a* and a second elastic base 632*a* extended longitudinally (i.e., in the Y-axial direction).

The first elastic base 631*a* and the second elastic base 632*a* may be each extend from both sides of the frame 111 in the longitudinally toward the inside of the frame 111.

The first elastic base 631*a* may include a first end as a fixed end supported on the frame 111, and a second end as a free end elastically supporting the second base portion 122*c* of the second blade 122.

The second elastic base 632*a* may include a first end as a fixed end supported on the frame 111, and a second end as a free end elastically supporting the third base portion 123*c* of the third blade 123. The second elastic base 632*a* may be positioned in rear of the first elastic base 631*a* (i.e., in the negative X-axial direction) and formed in parallel with the first elastic base 631*a*.

A first support arm 631*b* may be extended from the first elastic base 631*a* upwards (i.e., in the positive Z-axial direction) and support the second edge portion 122*b*. A second support arm 632*b* may be extended from the second elastic base 632*a* upwards (i.e., in the positive Z-axial direction) and support the third edge portion 123*b*.

Like the foregoing razor cartridge 10 according to the first embodiment, the first blade 121 is supported in the seating portion 114. As described in relation to the razor cartridge 10 according to the first embodiment, the first blade 121 may be supported by only the lateral accommodating groove 111*a* and/or the middle blade seating portion without the seating portion 114. Further, the concept of the seating portion may involve any configuration for fixedly supporting the first blade 121.

Referring to FIG. 15, in the razor cartridge 610 according to the sixth embodiment of the disclosure, the second cutting edge 122*a* and the third cutting edge 123*a* are disposed to have the positive exposure values with respect to the shaving plane S in the state that no external force acts. The first cutting edge 121*a* may be disposed to have a negative exposure value or an exposure value of '0' with respect to the shaving plane S.

Descriptions about the relative position between the shaving plane S and the blade 120 while no external force acts, the relative position between the shaving plane S and the blade 120 during the shaving, etc. are similar to those described with reference to FIGS. 5 and 6, and thus repetitive descriptions thereof will be avoided.

With respect to the same displacement, the first elastic base 631*a* and the second elastic base 632*a* may be different in elastic force. To this end, the first elastic base 631*a* and the second elastic base 632*a* may be formed to have different widths (i.e., length in the X-axial direction), different lengths (i.e., length in the Y-axial direction) and/or different thicknesses (i.e., length in the Z-axial direction), or may be made of materials different in modulus of elastic force.

When the first elastic base 631*a* and the second elastic base 632*a* are different in elastic force with respect to the same displacement, the second blade 122 elastically supported by the first elastic base 631*a* and the third blade 123 elastically supported by the second elastic base 632*a* may be differently displaced during the shaving process. For example, the elastic force generated by the second elastic base 632*a* may be designed to be greater than the elastic force generated by the first elastic base 631*a* with respect to the same displacement, so that the descending level of the third cutting edge 123*a* can be smaller than the descending level of the second cutting edge 122*a*. In this case, the third cutting edge 123*a* performing the last body hair cutting has a greater exposure value with respect to the shaving plane S than the second cutting edge 122*a*, thereby making it possible to get a cleaner shave.

Meanwhile, FIGS. 13 to 15 illustrate that the elastic arms 631 and 632 support the base portion of the blade through the elastic bases 631*a* and 632*a* and support the edge portion of the blade through the support arm 631*b* and 632*b*, but the disclosure is not limited to this embodiment. For example, the elastic arms 631 and 632 may support only the base portion of the blade or only the edge portion. When the elastic arms 631 and 632 support only the base portion of the blade, the elastic arms 631 and 632 may not include the support arm.

Further, FIGS. 13 to 15 illustrate that the elastic bases 631*a* and 632*a* are longitudinally extended from the frame 111 in parallel with each other, but the disclosure is not limited to this embodiment.

For example, the elastic bases 631*a* and 632*a* may be obliquely extended upwards (in the positive Z-axial direction) along the longitudinal direction. In this case, the free ends of the elastic bases 631*a* and 632*a* may support the edge portions of the blades directly without the support arm, or the support arms 631*b* and 632*b* extended from the free ends of the elastic bases 631*a* and 632*a* along the longitudinal direction may support the edge portions of the blades.

As described above, in the razor cartridge according to embodiments, the blade, of which the cutting edge has a relatively larger exposure value than those of other blades, among the plurality of blades is elastically supported, and thus the cutting edge having the positive exposure value can descend during the shaving process, so that the cutting edges 122*a* and 123*a* of the blades can have the exposure values suitable for the shaving. Thus, it is possible to get an ideal shave.

A person having ordinary knowledge in the art to which the disclosure pertains can understood that the disclosure may be embodied in other specific forms without changing technical spirit or essential features. Accordingly, the embodiments described above are illustrative and not restrictive in all aspects. The scope of the disclosure is defined by the appended claims rather than the foregoing detailed description, and all changes or modifications derived from the meaning and scope of the appended claims and their equivalents are construed as falling within the scope of the disclosure.

What is claimed is:

1. A razor cartridge comprising:

a plurality of blades respectively comprising a plurality of cutting edges, the plurality of blades including a first blade comprising a first cutting edge and a second blade comprising a second cutting edge;

a blade housing longitudinally accommodating the plurality of blades to expose the plurality of cutting edges at least partially through an upper portion thereof, the blade housing including a first contact surface and a second contact surface respectively disposed in front and rear of the plurality of cutting edges;

an elastic arm elastically supporting the second blade; and a blade fixing structure formed in the blade housing and fixedly supporting the first blade such that the first blade does not vertically move in response to external force being applied thereto, wherein the first contact surface and the second contact surface define a shaving plane, and wherein the first cutting edge has an exposure less than an exposure of the second cutting edge with respect to the shaving plane in response to no external force being applied.

2. The razor cartridge of claim 1, wherein:

in response to no external force being applied, the first cutting edge has a negative exposure value with respect to the shaving plane, and the second cutting edge has a positive exposure value with respect to the shaving plane.

3. The razor cartridge of claim 1, wherein the first blade is positioned between the second blade and the first contact surface.

4. The razor cartridge of claim 1, wherein the first blade is positioned between the second blade and the second contact surface.

5. The razor cartridge of claim 1, wherein the first blade is fixedly accommodated in the blade housing.

6. The razor cartridge of claim 1, wherein:

the first blade further includes a first base portion, and a first edge portion connecting the first cutting edge and the first base portion, the blade fixing structure includes a seating portion configured to accommodate the first base portion, and the elastic arm extends from the seating portion and is configured to elastically support the second blade.

7. The razor cartridge of claim 1, wherein:

the second blade further includes a second base portion, and a second edge portion connecting the second cutting edge and the second base portion, and the elastic arm is configured to elastically support at least one of the second base portion and the second edge portion.

8. The razor cartridge of claim 1, wherein:

the plurality of blades further includes a third blade comprising a third cutting edge, the elastic arm includes a first elastic arm configured to elastically support the second blade, and a second elastic arm configured to elastically support the third blade, and elastic force generated from the second elastic arm is smaller than elastic force generated from the first elastic arm with respect to same displacement.

9. The razor cartridge of claim 8, wherein:

in response no external force being applied, the third cutting edge has a larger exposure value than the second cutting edge with respect to the shaving plane.

10. The razor cartridge of claim 8, wherein the third blade is positioned between the second blade and the second contact surface.

11. The razor cartridge of claim 8, wherein the third blade is positioned between the second blade and the first contact surface.

12. The razor cartridge of claim 1, wherein the elastic arm transversely extends from the blade housing and is configured to support the second blade.

13. The razor cartridge of claim 1, further comprising a skin contact member disposed between the first contact surface and the second contact surface, and accommodated in the blade housing so as to be exposed at least partially through the upper portion of the blade housing.

14. The razor cartridge of claim 13, wherein the elastic arm extends from the skin contact member.

15. The razor cartridge of claim 1, wherein the blade fixing structure comprises at least one of a seating portion or a pair of lateral accommodating grooves formed at longitudinal lateral sides of the blade housing.

16. The razor cartridge of claim 1, wherein the blade fixing structure comprises the seating portion, and wherein the seating portion comprises a accommodating groove configured to accommodate and support the first base portion of the first blade.

* * * * *